United States Patent
Ballagh et al.

(10) Patent No.: US 7,284,225 B1
(45) Date of Patent: Oct. 16, 2007

(54) EMBEDDING A HARDWARE OBJECT IN AN APPLICATION SYSTEM

(75) Inventors: Jonathan B. Ballagh, Longmont, CO (US); L. James Hwang, Menlo Park, CA (US); Roger B. Milne, Boulder, CO (US); Nabeel Shirazi, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 602 days.

(21) Appl. No.: 10/850,133

(22) Filed: May 20, 2004

(51) Int. Cl.
*G06F 17/50* (2006.01)
*G06F 15/177* (2006.01)
*G06F 9/06* (2006.01)
*G06F 3/00* (2006.01)
*G06F 13/10* (2006.01)
*G06F 13/38* (2006.01)

(52) U.S. Cl. .............. 716/16; 716/18; 713/2; 713/100; 710/12; 710/36; 710/62; 710/72

(58) Field of Classification Search .......... 716/16, 716/18; 713/1, 2, 100; 710/12, 36, 62, 72
See application file for complete search history.

(56) References Cited

U.S. PATENT DOCUMENTS

| | | | |
|---|---|---|---|
| 5,535,342 A * | 7/1996 | Taylor | 710/315 |
| 6,487,709 B1 | 11/2002 | Keller et al. | |
| 6,725,441 B1 * | 4/2004 | Keller et al. | 716/16 |
| 6,883,147 B1 | 4/2005 | Ballagh et al. | |
| 6,911,840 B1 | 6/2005 | Milne et al. | |
| 7,003,751 B1 | 2/2006 | Stroomer et al. | |
| 7,203,632 B2 | 4/2007 | Milne et al. | |
| 2004/0049609 A1 * | 3/2004 | Simonson et al. | 710/8 |
| 2006/0179417 A1 * | 8/2006 | Madurawe | 716/17 |
| 2007/0043939 A1 * | 2/2007 | Fallon et al. | 713/2 |

OTHER PUBLICATIONS

U.S. Appl. No. 10/850,133, filed May, 20, 2004, Ballagh et al.
U.S. Appl. No. 10/388,681 by Milne et al filed by Xilinx Inc. Mar. 14, 2003.
Xilinx, Inc.; "System Generator for DSP"; User's Guide; Version 9.1; Feb. 16, 2007; available from Xilinx, Inc., 2100 Logic Drive, San Jose, California 95124; pp. 60, 193.
U.S. Appl. No. 10/850,178 by Ballagh et al. filed by Xilinx, Inc. on May 20, 2004.

(Continued)

*Primary Examiner*—Phallaka Kik
(74) *Attorney, Agent, or Firm*—LeRoy D. Maunu; Kim Kanzaki

(57) ABSTRACT

Various approaches for interfacing an application-independent hardware object with an application system are disclosed. The various approaches involve instantiating a first object that contains at least one configuration parameter. The configuration parameter specifies a location of a configuration bitstream for implementing functions of the hardware object in a programmable logic circuit. A second object is instantiated and is configured to open, in response to a program call to a first function provided by the second object, an interface to the programmable logic circuit. A programmable logic circuit is configured with the configuration bitstream in response to instantiation of the second object, and, in response to a program call to the first function, an interface to the programmable logic circuit is opened.

15 Claims, 4 Drawing Sheets

OTHER PUBLICATIONS

Stuart Sutherland; "The Verilog PLI Handbook"; A User's Guide and Comprehensive Reference on the Verilog Programming Language Interface; published by Kluwer Academic Publishers; Copyright 1999 by Kluwer Academic Publishers; pp. pp. 36-37.

Mentor graphics; "ModelSim SE Foreign Language Interface"; Version 6.1e; published Mar. 2006; Copyright Mentor Graphics Corporation 2006; pp. 10-25.

Leandro Soares Indrusiak et al.; "Ubiquitous Access to Reconfigurable Hardware: Application Scenarios and Implementation Issues"; Proceedings of the Design Automation and Test in Europe Conference and Exhibition; 2003; Copyright 2003 IEEE; pp. 1-6.

\* cited by examiner

Example adapter layer C++ Code for an FFT Function

```
#define NUM_FFT_COMP_CYCLES 1024
#define INPUT_PORT 0
define OUTPUT_PORT 0 vector<int> performFFT(vector<int> inVec)
{
   vector<int> outVec(input.size());
   config_params_obj cpo = buildParamsObj();
   SpecializedHardwareObject sho(cpo);

sho.open()                           // Open hardware platform.
   sho.force(INPUT_PORT, input);        // Send input vector to input port
   sho.run(NUM_FFT_COMP_CYCLES);        // Step hardware to compute FFT.
   sho.examine(OUTPUT_PORT, outVec);    // Read vector from output port.
   sho.close();                         // Close hardware platform.

return outVec;
}
```

FIG. 2

Constructing a Configuration Parameters Object

```
ConfigParams cp;
GenericIterator g;
GenericsList g_list;

g_list = get_component_generics();

for (g = g_list.begin(); g != g_list.end(); g++)
{
   if (g->getType() == STRING_TYPE)
     cp.addString(g->getName(), g->getValue());
   else if (g->getType() == ARRAY_TYPE)
     cp.addArray(g->getName(), g->getValue());
   ...
}
```

EMBEDDING A HARDWARE OBJECT IN AN APPLICATION SYSTEM

FIELD OF THE INVENTION

The present invention generally relates to embedding a hardware object in an application system.

BACKGROUND

A high level modeling system (HLMS) is a software tool in which electronic designs can be described, simulated, and translated by machine into a design realization. An HLMS provides a higher level of abstraction for describing an electronic circuit than a hardware description language (HDL) simulation environment such as the ModelSim environment from the Model Technology company. An HLMS generally provides a mathematical representation of signals as compared to standard logic vectors in a hardware description language (HDL). It is desirable for the high-level abstractions to be precisely correlated with the ultimate implementation representation, both in simulation semantics and in implementation. The Xilinx System Generator tool for DSP and the MathWorks' Simulink and MATLAB environments are example HLMS's in which such capabilities are desirable.

An HLMS for electronic circuit design generally offers abstractions that are not available in traditional HDLs. For example, an HLMS is likely to offer abstractions that relate to signal propagation and signal state, while an HDL may support a detailed representation that more closely models a realized electronic circuit. An electronic design modeled in an HLMS may be viewed as a collection of components that communicate through signals. Signals are discrete, time-varying sequences of values. An HLMS generally provides abstractions to support implementing synchronous designs without requiring the specification of explicit references to clocks or clock signals. Instead of providing a detailed, event driven simulation, an HLMS may also provide abstractions wherein clock-synchronous state changes are scheduled to occur at regular intervals and in which there is no notion of the timing characteristics related to the intended implementation as an electronic circuit. In further support of creating high-level designs, an HLMS may also represent state in terms of numerical (or other abstract) values instead of representing state in a detailed format analogous to standard logic vectors.

An HLMS such as Sysgen also has the capability to co-simulate a design. Co-simulation generally refers to dividing a design into portions and simulating the portions on two or more platforms. There are different types of platform on which designs can be co-simulated.

Example co-simulation platforms include both software-based and hardware-based systems. The Modelsim simulator and the NC-SIM simulator from Cadence are example software-based systems, and the Wildcard development platform from Annapolis Microsystems and the Benone development platform from Nallatech are example hardware-based systems. The WildCard and Benone platforms are often used for algorithm exploration and design prototyping. In software-based co-simulations, the user may perform a behavioral simulation or perform simulation using a synthesized and mapped version of the design.

In a hardware-based system, a portion of the design is emulated on a hardware platform that includes a programmable logic device (PLD), such as a field programmable gate array (FPGA). Co-simulating on a hardware platform may be used to reduce the time required for a simulation run.

The hardware objects created by the present Sysgen system for hardware co-simulation are useful only in the Simulink system. The Simulink system encapsulates the hardware object in a run-time block, and the parameters used by the objects for initialization and operation are specific to the Simulink system. Thus, the hardware objects created by the present Sysgen system are incompatible with co-simulation frameworks other than the Simulink system and incompatible in general with systems other than simulation-based systems.

The present invention addresses one or more of the above issues.

SUMMARY OF THE INVENTION

The various embodiments of the invention support interfacing an application-independent hardware object with an application system are disclosed. A first object that contains at least one configuration parameter is instantiated. The configuration parameter specifies a location of a configuration bitstream for implementing functions of the hardware object in a programmable logic circuit. A second object is instantiated and is configured to open, in response to a program call to a first function provided by the second object, an interface to the programmable logic circuit. A programmable logic circuit is configured with the configuration bitstream in response to instantiation of the second object, and, in response to a program call to the first function, an interface to the programmable logic circuit is opened.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 2 is a code block of a example application adapter layer for a hardware object that implements an FFT function;

FIG. 3 illustrates a block of code for constructing the configuration parameters object by an application adapter layer;

DETAILED DESCRIPTION

Figure 1:
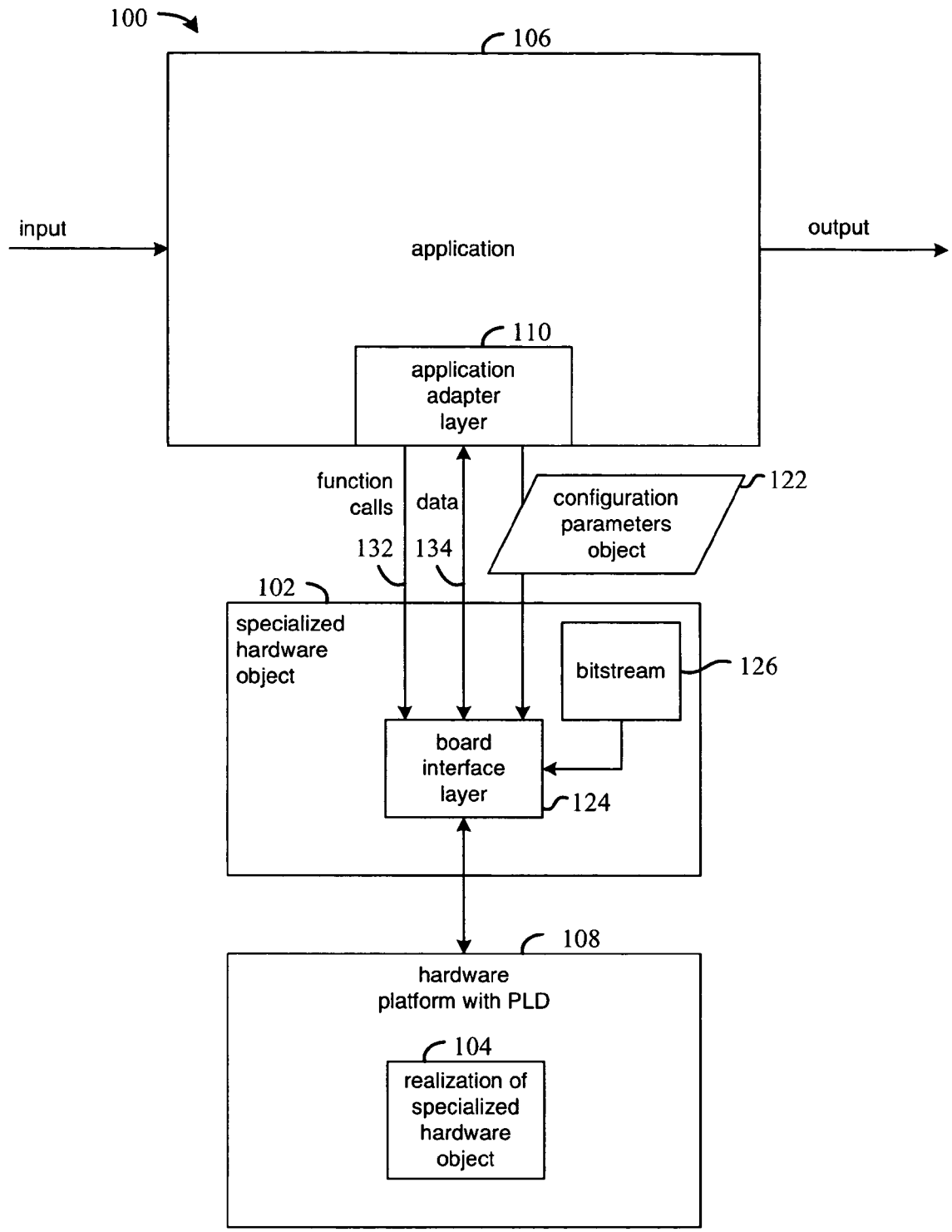
FIG. 1 is a block diagram of an example system 100 in which a hardware object generated from an high-level modeling system (HLMS) is embedded in the system and accessible to application software via an application adapter layer.

FIG. 1 is a block diagram of an example system 100 in which a hardware object generated from an high-level modeling system (HLMS) is embedded in the system and accessible to application software via an application adapter layer. The portion of the system that is realized in hardware is encapsulated in an application-independent, specialized hardware object 102, which provides a generic interface to the realization 104 of the hardware object for application 106. Encapsulating a portion of a design provides benefits such as hardware acceleration (e.g., reducing simulation time) and handling incompatible simulation languages.

The major functional blocks in the example system 100 include application 106, specialized hardware object 102, and hardware platform 108. Application 102 uses an application adapter layer 110 to interface with the hardware object. It will be appreciated that the adapter layer may be implemented in any programming language suitable to the requirements of application 106. In one embodiment, the adapter layer obtains design-specific or application-specific parameters values from the application 106 and creates configuration parameters object 122. The configuration parameters object is provided to the specialized hardware object 102 so that the specialized hardware object can be used independent of the interface particulars of the application 106. In another embodiment, these parameters are hard-coded into the adapter layer during specialization.

The specialized hardware object 102 is an object (an object-oriented programming object) that provides the interface between the application 106 and the hardware platform 108. The specialized hardware object includes a board interface layer 124 that handles the hardware-level interface to the hardware platform 108. The hardware platform includes a PLD (not shown) that is configured with configuration bitstream 126, and the configured PLD provides a realization 104 of the specialized hardware object.

The board interface layer implementation is independent of the application 106. However, the board interface layer needs certain information from the application, such as data widths, data rates, and data types associated with the realization 104 of the hardware object. The location of the configuration bitstream is also provided to the board interface layer so that the board interface layer can obtain the bitstream for configuring the PLD on the hardware platform. This information is passed to the board interface layer using the configuration parameters object 122.

The board interface layer 124 includes a set of program-callable functions that are available to the adapter layer 110, and the application controls the hardware object through calls to these functions. The functions may be implemented in a dynamically linked library that provides an interface layer through which the application can communicate with the underlying hardware platform 108. Line 132 represents calls by the application adapter layer 110 to functions provided by the board interface layer 124, and line 134 represents data passed between the adapter layer and the board interface layer.

The hardware platform may include a variety of electronic components depending on system requirements. In development platforms, such as the WildCardII and BenOne platforms, the hardware platform is typically an FPGA development board containing one or more FPGAS. The specialized hardware object 102 and board interface layer 124 abstract away the details of the hardware platform by providing a generic programming language interface. Example functions include open, close, run, force, and examine.

The open and close functions respectively open and close the hardware platform to begin and end interactions with the hardware platform. The run function steps the hardware platform a number of clock cycles specified by the call from application adapter layer 110. The force function sets the value of an input port on the realization 104 of the hardware object, and the examine function reads the value of an output port on the hardware object.

Each specialized hardware object 102 is tailored to a specific hardware platform. Thus, a different specialized hardware object may be needed for each different hardware platform on which the hardware object is to be realized.

In the co-pending patent application entitled, "EMBEDDING A CO-SIMULATED HARDWARE OBJECT IN AN EVENT-DRIVEN SIMULATOR", an event-driven HDL simulator (a specific example of an application 106) interfaces with a realization of a specialized hardware object during simulation. The co-pending, commonly assigned, patent application has inventors Jonathan B. Ballagh et al., is filed concurrently with the present application, and is herein incorporated by reference.

FIG. 2 is a code block 202 of a example application adapter layer for a hardware object that implements an FFT function. The application adapter layer is generally customized to particularities of both the calling application and the hardware object with which it interfaces. The details of interacting with the hardware platform and hardware object are hidden from the calling application.

The adapter layer 110 may require software specialization, such as generation of C code stubs, when the specialized hardware object 110 is generated. The adapter layer generally performs functions of constructing the configuration parameters object 122, translating data in the application 106 into data that can be interpreted by the board interface layer 124, and translating events in the application into corresponding calls to functions in the board interface layer.

The implementation of the adapter layer varies depending on the application. In the case of Sysgen/Simulink hardware co-simulation, the adapter layer is implemented as an S-function. This S-function is associated with a hardware co-simulation block, and allows the co-simulation module to interact with the Simulink environment. The S-function builds a configuration parameters object by examining the mask workspace variables (associated with the co-simulation block) and creating corresponding entries in the configuration parameters object. This information is passed to an instance of the specialized hardware object 102 when simulation starts. During simulation, the S-function translates simulation events (e.g., events on the block's ports) into correspond board interface layer function calls.

In a particular use case in which custom C code is generated for a co-simulation module, the adapter layer 110 is written as part of this code. When this code is ultimately compiled, the hardware is completely abstracted by a software function. The example block 202 of C code illustrates an example FFT specialized hardware object that can be wrapped in a function interface. In hardware, the FFT data path has one input port and one output port.

The function name is perform FFT, which takes as input a vector of integers and returns as output a vector of integers (line 204). The configuration parameters object is constructed at line 206 and provided to the specialized hardware object at line 208. Lines 210 call the functions in the board interface layer for opening the hardware platform, providing the input to the realization of the hardware object, running the platform for an appropriate number of clock cycles, examining the output from the hardware platform, and closing the platform. Even though it is not illustrated, it will be appreciated that instantiation of the specialized hardware object (line 208) includes configuring the PLD on the hardware platform with the configuration bitstream referenced by the configuration parameters object.

FIG. 3 illustrates a block 252 of code for constructing the configuration parameters object by an application adapter layer. In this example, parameters are assigned values based on generic values contained in an HDL component.

In an example use case in which the hardware object is used in simulation, the ModelSim FLI provides methods for examining the generic names and values associated with a foreign architecture component. The pseudo code for using these methods to construct a configuration parameters object is illustrated in code block 252. The code iterates (254) through the list of generics (256) and constructs (258) a corresponding configuration parameters object that stores the generics' names and values as key/value pairs, respectively.

The configuration parameters object may be built when the adapter layer 120 is initialized, for example, in an adapter layer's class constructor. In another embodiment involving an implementation with the Simulink system, the adapter layer generates the configuration parameters object by examining the mask parameters of the run-time co-simulation block. In a similar manner, an HDL simulator adapter layer may build the mask parameters object using generic values defined in the HDL proxy component 112. This requires that the generic and generic values are added to the custom proxy component by the HLMS when the design is compiled for hardware co-simulation. The co-pending patent application by Jonathan B. Ballagh et al., which is incorporated by reference above, contains further description of including specialized hardware object in an event driven simulator.

Figure 4:
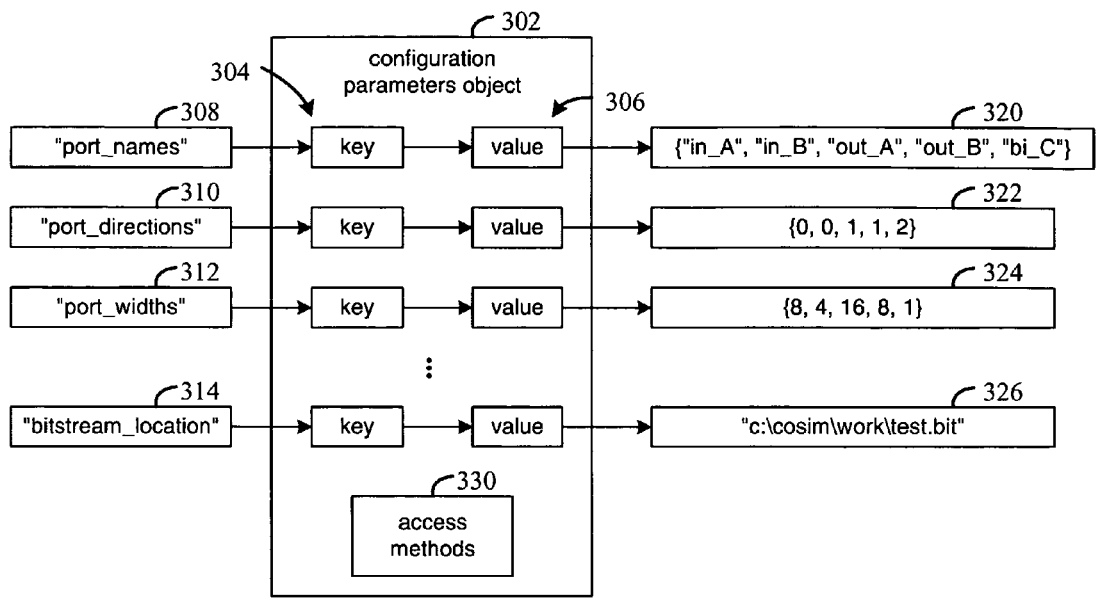
FIG. 4 is a block diagram of an example configuration parameters object.

FIG. 4 is a block diagram of an example configuration parameters object 302. A set of keys 304 is used to obtain values 306 of port_names 308, port_directions 310, port_widths 312, and the bitstream_location 314 (file name and location of the bitstream to use in configuring the PLD). Example corresponding values of the port_names are the set 320 of port names, in_A, in_B, out_A, out_B, and bi_C. The set 322 of port directions indicates directions of the set of ports 320. A 0 value indicates an input port, a 1 value indicates an output port, and 2 value indicates a bi-directional port. Set 324 specifies the widths in bits of the named ports. The example value 326 of the bitstream_location is represented by the character string, c:\cosim\work\test.bit.

The configuration parameter object further includes design behavior characteristics such as whether the design has a combinational path from an input port to an output port. For example, the configuration parameters object includes the generic, "hasCombinationalPath: string:="true", which indicates whether the design contains at least one path from an input port to an output port with no sequential (i.e., clocked) elements. In other words, a change on an input may affect an output port without a clock event. This information can be used to make certain optimizations in the adapter layer. For example, if the design does not include a combinational path, the adapter layer need not update the output port states when the value of an input port changes. This improves co-simulation performance since it reduces the number of transactions required between the adapter layer and the hardware-based co-simulation platform. Whether a design has a combinational path may be determined using known analysis techniques.

The configuration parameters object also includes methods 330 for adding and retrieving various types of data using the key-value pairs. The methods further include error handling and type checking routines. The board interface layer 114 is passed the configuration parameters object 302 when the board interface layer is initialized. The board interface layer retrieves the configuration information it requires by indexing into the configuration parameters object with a fixed set of key strings (e.g., "bitstream_location"). The board interface layer only reads data from this object, and does not modify its contents.

Appendix A, which is herein incorporated by reference, has snippets of C code which puts together FIGS. 2 and 3 for the FFT function example having a 16 bit data_in port and a 16 bit data_out port. One example of a class description for "SpecializedHardwareObject" is also given. The specialized hardware object in this example is SpecializedHardwareObject sho(cpo), which has function calls, e.g., sho.open( ), to the board interface layer. The board interface layer functions include device specific device drivers. Appendix B, which is herein incorporated by reference, has example board interface layer pseudo-code for the Open function for a FPGA platform named "ExampleFPGAPlatform". Both Appendices A and B are for illustration purposes and are not meant to limit the scope of the invention.

Figure 5A:
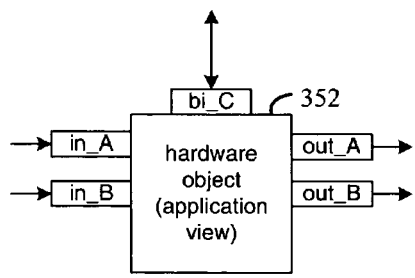
FIG. 5A illustrates an example hardware object.
Figure 5B:
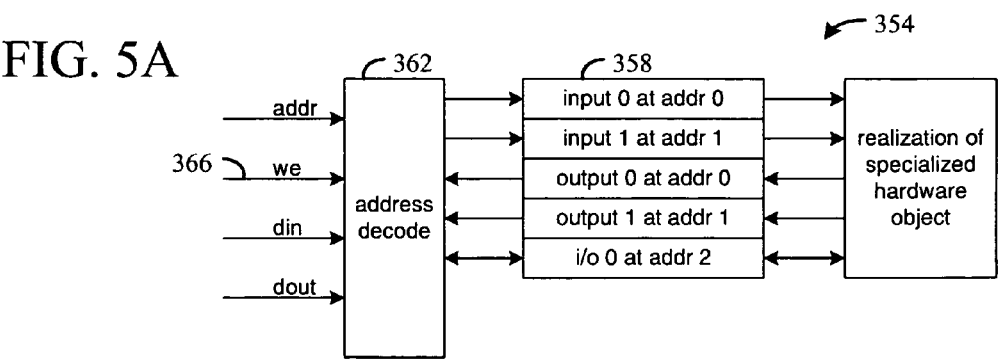
FIG. 5B illustrates a memory map interface implemented for the hardware object.

FIG. 5A illustrates an example hardware object 352, from the perspective of application 106, with input and output ports corresponding to the example configuration parameters object 302 of FIG. 4, and FIG. 5B illustrates a memory map interface 354 implemented for the hardware object 352. The realization of each hardware object includes a memory map interface.

The memory map interface 354 may be generated when an HLMS such as Sysgen implements a hardware object, such as for hardware co-simulation. In this use case, the design under test, or DUT (i.e., the portion of the model that is being compiled), is translated into a corresponding HDL description, and a custom HDL wrapper is created for the DUT with logic (memory map, bus interfaces, etc.) to support communication with the board interface layer 114 and realization of the specialized hardware object.

The memory map interface 354 reserves a portion of memory in the PLD for storage of input and output values for the realization of the specialized hardware object. Elements 358 of the memory map correspond to I/O ports on the hardware object 352. The board interface layer 114 reads and writes to specific ports on the realization of the specialized hardware object by generating an address that the address decode logic 362 is able to decode. The address is computed using the index of port to generate an address offset that references one of elements 358.

Each pair of input and output ports share an index value. For example, input port, in_A, and output port out_A may share the index value 0. Address decode logic 362 determines the direction of the data flow by the state of the we signal on line 366. Thus, the index value 0 for in_A and out_A may both reference addr0, with the we signal state determining the flow of data.

Figure 6:
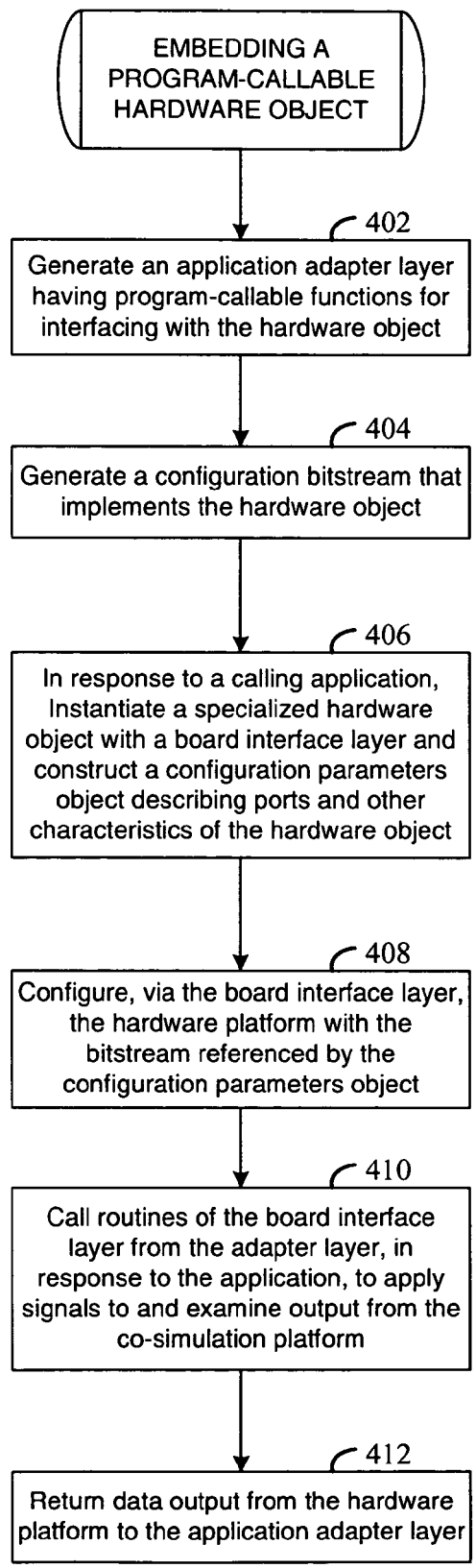
FIG. 6 is a flow diagram of an example process for embedding a callable hardware object in accordance with various embodiments of the invention.

FIG. 6 is a flow diagram of an example process for embedding a callable hardware object in accordance with various embodiments of the invention. An adapter layer is written (step 402) for use with a specialized hardware object. In an example implementation involving a simulation system, the adapter layer includes program code that implements callback functions associated with input ports of the hardware object. The callback functions in the adapter layer are configured to call the generalized functions (i.e., open, close, run, force, and examine) in the board interface layer.

To realize an implementation (FIG. 1, 104) of a hardware object, an HDL description of the object may be compiled and the output further processed using conventional tools to produce a configuration bitstream (step 404). When a system (e.g., FIG. 1, 100) is initialized, a specialized hardware object 102 is instantiated and a configuration parameters object 122 is constructed (step 406). The configuration parameters object is provided to the specialized hardware object to indicate port definitions of the hardware object, various characteristics about the behavior of the hardware object, and the name and location the configuration bitstream to use in configuring a PLD.

A board interface layer 124 is included as part of the instantiated specialized hardware object. The board interface layer includes the generalized functions that are callable by the adapter layer, and these functions are adapted, by the maker of the board, to interface to a particular hardware platform.

When the system is initialized, the adapter layer calls the open function of the board interface layer, and the board interface layer initiates configuration of the PLD on the co-simulation platform with the bitstream specified by the configuration parameters object (step 408). The input port callback functions in the adapter layer call run and force functions of the board interface layer in response to calls made or events generated by the application (step 410). The input port callback functions in the adapter layer may also check for output from the realization of the specialized hardware object after forcing input. The returned data is provided to the application according to application interface requirements (step 412).

Those skilled in the art will appreciate that various alternative computing arrangements would be suitable for hosting the processes of the different embodiments of the present invention. In addition, the processes may be provided via a variety of computer-readable media or delivery channels such as magnetic or optical disks or tapes, electronic storage devices, or as application services over a network.

The present invention is believed to be applicable to a variety of systems for co-simulation and has been found to be particularly applicable and beneficial in hardware acceleration and event driven co-simulation using PLDs. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

APPENDIX A

```
// Note:C-code is generated during HLMS compilation of the design
#define NUM_FFT_COMP_CYCLES 1024
#define INPUT_INDEX 0
#define OUTPUT_INDEX 0
ConfigParamsObj buildParamsObj ( )
{
    ConfigParamsObj cpo;
    cpo.addString("port_names", "data_in, data_out");
    cpo.addString("port_widths", "16,16");
    ...
    cpo.addString("bitfile_location",
"c:\cosim_work est.bit");
    return cpo;
}
vector<int> performFFT(vector<int> inVec)
{
    // Create a new vector to store FFT results.
    vector<int> outVec(input.size( ));
    // Construct configuration parameters object.
```

-continued

```
    config_params_obj cpo = buildParamsObj( );
    // Instantiate a C specialized hardware object.
    SpecializedHardwareObject sho(cpo);
    sho.open( )                        // Open hardware platform.
    sho.force(INPUT_INDEX inVec);       //Send input vector to input port.
    sho.run                             // Step hardware to compute FFT.
    (NUM_FFT_COMP_CYCLES);
    sho.examine(OUTPUT_INDEX,           //Read vector from output port.
    outVec);
    sho.close( );                       // Close hardware platform.
}
class SpecializedHardwareObject
{
    public:
// Constructor uses configuration parameters to locate appropriate
        // board interface layer and FPGA configuration bitstream.
        SpecializedHardwareObject (ConfigParamsObj cpo);
// Function calls below invoke corresponding functions
    // in board interface layer.
        void open( );
        void run(int num_steps);
        void close( );
        void force(int port_index, vector<int> input_data);
        vector<int> examine(int port_index);
    private:
        string bitFileLocation;    // Location of bitstream.
//Pointer to appropriate board interface layer.
        boardInterfaceLayer* bil;
    ...
}
APPENDIX B
// Example board interface layer pseudo-code for Open
function for a platform named "ExampleFPGAPlatform"
void ExampleFPGAPlatform::open(string bitFileLocation)
{
    platformHandle pHndl; // Handle to FPGA platform.
    // Load device driver for platform.
    LoadLibrary("device_driver.dll");
    // Find FPGA platform hardware.
    pHndl = DeviceDriver_LocatePlatform( );
    // Open FPGA platform hardware.
    DeviceDriverOpenPlatform(pHndl);
    // Configure FPGA platform with configuration bitstream.
    DeviceDriver_Configure(pHndl, bitFileLocation);
}
```

What is claimed is:

1. A method for interfacing an application-independent hardware object with a software system, comprising:

instantiating a first object containing at least one configuration parameter that specifies a location of a configuration bitstream for implementing functions of the hardware object in a programmable logic circuit;

wherein the first object is instantiated in memory of a computing arrangement by application software executing on the computing arrangement;

instantiating a second object, the second object being configured to open, in response to a program call to a first function provided by the second object, an interface to the programmable logic circuit;

wherein the second object is instantiated in the memory by the application software executing on the computing arrangement;

configuring the programmable logic circuit with the configuration bitstream in response to instantiation of the second object;

opening, in response to a program call to the first function, an interface to the programmable logic circuit;

wherein the call to the first function is initiated by the application software; and applying a number of cycles of a clock signal to the programmable logic circuit in response to a program call by the application software that specifies the number of cycles to a second function provided by the second object.

2. The method of claim 1, further comprising closing, in response to a program call from a calling program to a third function provided by the second object, the interface to the programmable logic circuit.

3. The method of claim 1, further comprising:

wherein the first object contains configuration parameters that specify characteristics of at least one input port of the hardware object, and the second object being configured to provide, in response to a program call to a fourth function provided by the second object, input data to the programmable logic circuit via the at least one input port consistent with the characteristics of the at least one input port; and providing, in response to a program call to the fourth function, input data to the programmable logic circuit via the at least one input port.

4. The method of claim 3, further comprising:

wherein the first object contains configuration parameters that specify characteristics of at least one output port of the hardware object, and the second object being configured to obtain, in response to a program call to a fifth function provided by the second object, output data from the programmable logic circuit via the at least one output port, consistent with the characteristics of the at least one output port;

reading, in response to a program call from a calling program to the fifth function, a data value from the at least one output port of the hardware object implemented on the programmable logic circuit; and returning the data value to the calling program.

5. The method of claim 3, wherein the characteristics of the at least one input port indicate a width in bits of the port.

6. The method of claim 5, wherein the characteristics of the at least one input port indicate a signal flow direction of the port.

7. The method of claim 6, wherein the characteristics of the at least one input port include a port identifier.

8. An apparatus for interfacing an application-independent hardware object with a software system, comprising:

means for instantiating a first object containing at least one configuration parameters that specifies a location of a configuration bitstream for implementing functions of the hardware object in a programmable logic circuit;

wherein the first object is instantiated in memory of a computing arrangement by application software executing on the computing arrangement;

means for instantiating a second object, the second object being configured to open, in response to a program call to a first function provided by the second object, an interface to the programmable logic circuit;

wherein the second object is instantiated in the memory by the application software executing on the computing arrangement;

means for configuring the programmable logic circuit with the configuration bitstream in response to instantiation of the second object;

means for opening, responsive to a program call to the first function, an interface to the programmable logic circuit;

wherein the call to the first function is initiated by the application software; and applying a number of cycles of a clock signal to the programmable logic circuit in response to a program call by the application software that specifies the number of cycles to a second function provided by the second object.

9. A system for interfacing an application-independent hardware object with a software system, comprising:

a programmable logic circuit;

an application adapter coupled to the application system, the application adapter configured to instantiate a first object containing at least one configuration parameter that specifies a location of a configuration bitstream for implementing functions of the hardware object in the programmable logic circuit;

wherein the application adapter executes on a computing arrangement and instantiates the first object in memory of the computing arrangement in response to a program call by application software executing on the computing arrangement;

a second object coupled to the application adapter and to the programmable logic circuit, the second object configured to configure the programmable logic circuit with the configuration bitstream referenced by the first object, and open, in response to a program call by the application adapter to a first function provided by the second object, an interface to a programmable logic circuit;

wherein the second object is instantiated in the memory by the application adapter in response to a program call by the application software executing on the computing arrangement, and the call to the first function is initiated by the application software; and wherein the second object is further configured with a second function that applies a number of cycles of a clock signal to the programmable logic circuit in response to a program call by the application adapter that specifies the number of cycles to the second function.

10. The system of claim 9, wherein the second object is further configured with a third function that closes in response to a program call by the application adapter to the third function, the interface to the programmable logic circuit.

11. The system of claim 9, further comprising:

wherein the first object contains configuration parameters that specify characteristics of at least one input port of the hardware object; and wherein the second object is further configured with a fourth function that provides, in response to a program call by the application adapter to the fourth function, input data to the programmable logic circuit via the at least one input port consistent with the characteristics of the at least one input port.

12. The system of claim 11, further comprising:

wherein the first object contains configuration parameters that specify characteristics of at least one output port of the hardware object; and wherein the second object is further configured with a fifth function that obtains, in response to a program call by the application adapter to the fifth function, output data from the programmable logic circuit via the at least one output port, consistent with the characteristics of the at least one output port and returns the data value to the application adapter.

13. The system of claim 11, wherein the characteristics of the at least one input port indicate a width in bits of the port.

14. The system of claim 13, wherein the characteristics of the at least one input port indicate a width in bits of the port.

15. The system of claim 14, wherein the characteristics of the at least one input port include a port identifier.

* * * * *